US012648503B2

(12) United States Patent
Irvin

(10) Patent No.: US 12,648,503 B2
(45) Date of Patent: Jun. 9, 2026

(54) AGRICULTURAL SYSTEM AND METHOD FOR MONITORING YAW OF TOWED AGRICULTURAL IMPLEMENTS

(71) Applicant: CNH Industrial America LLC, New Holland, PA (US)

(72) Inventor: Mark Irvin, Boone, IA (US)

(73) Assignee: CNH Industrial America LLC, New Holland, PA (US)

( * ) Notice: Subject to any disclaimer, the term of this patent is extended or adjusted under 35 U.S.C. 154(b) by 550 days.

(21) Appl. No.: 18/107,863

(22) Filed: Feb. 9, 2023

(65) Prior Publication Data

US 2024/0268249 A1 Aug. 15, 2024

(51) Int. Cl.
| | |
|---|---|
| *E01H 5/04* | (2006.01) |
| *A01B 35/16* | (2006.01) |
| *A01B 49/02* | (2006.01) |
| *A01B 63/00* | (2006.01) |
| *A01B 79/00* | (2006.01) |
| *E01H 5/08* | (2006.01) |
| *G01C 21/16* | (2006.01) |

(52) U.S. Cl.
CPC ............. *A01B 79/00* (2013.01); *A01B 35/16* (2013.01); *A01B 63/008* (2013.01); *G01C 21/16* (2013.01); *A01B 49/027* (2013.01)

(58) Field of Classification Search
None
See application file for complete search history.

(56) References Cited

U.S. PATENT DOCUMENTS

| | | | |
|---|---|---|---|
| 8,145,391 | B2 | 3/2012 | Omelchenko et al. |
| 9,347,205 | B2 | 5/2016 | Kosarev et al. |
| 10,428,493 | B2 | 10/2019 | Omelchenko et al. |
| 11,191,204 | B2 | 12/2021 | Kovach et al. |
| 11,274,416 | B2 | 3/2022 | Veasy et al. |

(Continued)

OTHER PUBLICATIONS

Yag Li et al. "An Acquisition Method of Agricultural Equipment Roll Angle Based on Multi-Source Information Fusion" Sensors Apr. 7, 2020 (15 pages) https://www.mdpi.com/1424-8220/20/7/2082/htm.

(Continued)

*Primary Examiner* — Christopher J Sebesta
*Assistant Examiner* — Alfred H Tsui
(74) *Attorney, Agent, or Firm* — Dority & Manning, P.A.

(57) ABSTRACT

An agricultural system for monitoring yaw of an agricultural implement having a frame connectable to an agricultural work vehicle, a first plurality of disks supported on the frame and angled leftward, and a second plurality of disks supported on the frame and angled rightward, where the first plurality of disks engages a field at a first penetration depth, and the second plurality of disks engages the field at a second penetration depth. The system further includes an orientation sensor supported on the agricultural implement and configured to generate data indicative of yaw of the agricultural implement. Additionally, the system includes a computing system configured to receive the data generated by the orientation sensor, determine the yaw of the agricultural implement based at least in part on the data generated by the orientation sensor, and initiate a control action based at least in part on the yaw of the agricultural implement.

18 Claims, 6 Drawing Sheets

(56) References Cited

U.S. PATENT DOCUMENTS

| | | | | |
|---|---|---|---|---|
| 11,277,956 | B2 | 3/2022 | Bertucci et al. | |
| 2018/0338413 | A1* | 11/2018 | Connell | B62D 55/065 |
| 2020/0102718 | A1 | 4/2020 | Cline et al. | |
| 2020/0196512 | A1 | 6/2020 | Deng et al. | |
| 2021/0315146 | A1* | 10/2021 | Hake | A01B 49/027 |
| 2021/0372083 | A1 | 12/2021 | Velde et al. | |
| 2022/0065628 | A1 | 3/2022 | Ishibashi | |
| 2022/0090351 | A1 | 3/2022 | Komura et al. | |
| 2022/0243422 | A1 | 8/2022 | Kassen et al. | |

OTHER PUBLICATIONS

D.I. Suna et al. "Pose and Position Estimation of Dozer Blade in 3-dimensional by Integration of IMU with Two RTK GPSs" 34th International Symposium on Automation and Robotics in Construction (ISARC 2017) (6 pages) http://www.iaarc.org/publications/fulltext/ISARC2017-Paper137.pdf.
Yeon-Soo Kim et al. "Analysis of the Effect of Tillage Depth on the Working Performance of Tractor-Moldboard Plow System under Various Field Environments" Sensors Apr. 2, 2022 (21 pages) https://www.mdpi.com/1424-8220/22/7/2750/pdf.

* cited by examiner

300

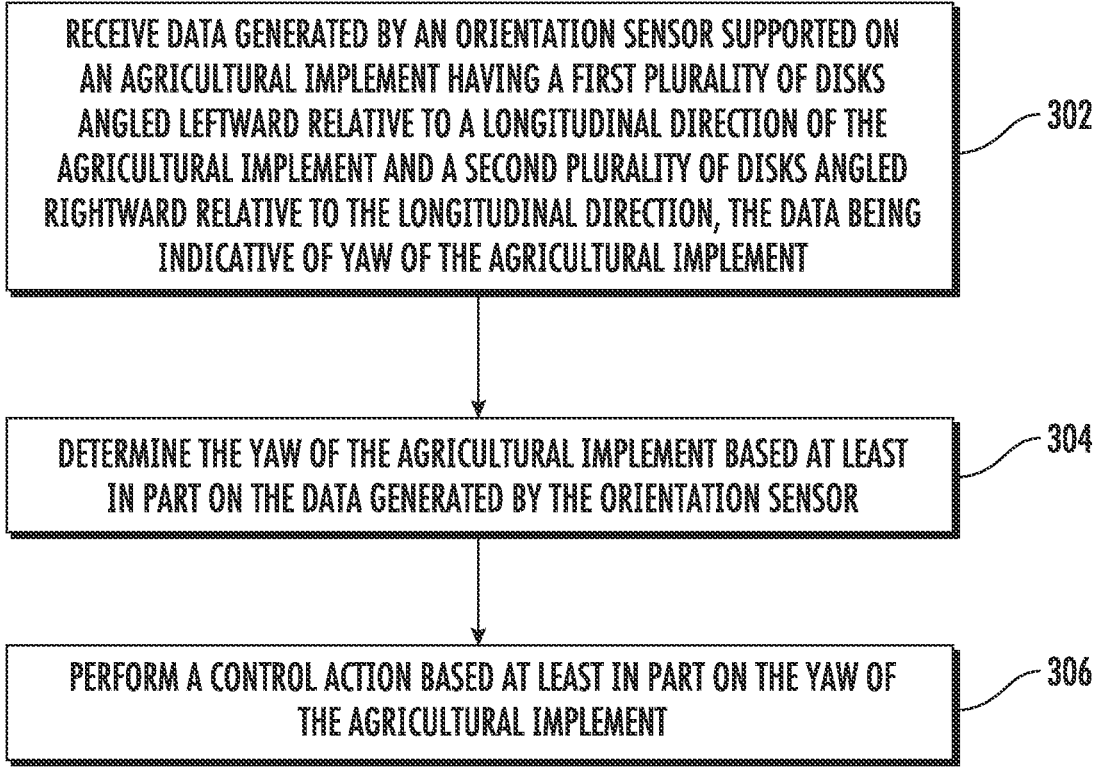

RECEIVE DATA GENERATED BY AN ORIENTATION SENSOR SUPPORTED ON AN AGRICULTURAL IMPLEMENT HAVING A FIRST PLURALITY OF DISKS ANGLED LEFTWARD RELATIVE TO A LONGITUDINAL DIRECTION OF THE AGRICULTURAL IMPLEMENT AND A SECOND PLURALITY OF DISKS ANGLED RIGHTWARD RELATIVE TO THE LONGITUDINAL DIRECTION, THE DATA BEING INDICATIVE OF YAW OF THE AGRICULTURAL IMPLEMENT ⟋ 302

DETERMINE THE YAW OF THE AGRICULTURAL IMPLEMENT BASED AT LEAST IN PART ON THE DATA GENERATED BY THE ORIENTATION SENSOR ⟋ 304

PERFORM A CONTROL ACTION BASED AT LEAST IN PART ON THE YAW OF THE AGRICULTURAL IMPLEMENT ⟋ 306

FIG. 6

AGRICULTURAL SYSTEM AND METHOD FOR MONITORING YAW OF TOWED AGRICULTURAL IMPLEMENTS

FIELD OF THE INVENTION

The present disclosure relates generally to agricultural implements and, more particularly, to systems and methods for monitoring yaw of towed implements.

BACKGROUND OF THE INVENTION

To attain better agricultural performance from a field, a farmer cultivates the soil, typically through a tillage operation. Farmers may perform the tillage operation by pulling a tillage implement behind an agricultural work vehicle, such as a tractor. Tillage implements can include one or more ground-engaging tools configured to engage the soil as the implement is moved across the field. For example, in certain configurations, the implement may include one or more harrow disks, leveling disks, rolling baskets, shanks, tines, and/or the like. Such ground-engaging tools loosen and/or otherwise agitate the soil to prepare the field for subsequent planting operations.

In some instances, the tillage implements have sets of rotating ground engaging tools that are oriented in different directions, such as sets of forward disks that are angled in one direction (e.g., to the left) relative to a fore-aft direction of the implement and sets of rearward disks that are angled in an opposite direction (e.g., to the right) relative to the fore-aft direction. A penetration depth of the forward disks is generally set shallower than a penetration depth of the rearward disks so that the forward and rearward disks equally engage unworked soil. By relatively evenly engaging unworked soil, the pull of the implement to the left and the pull of the implement to the right are also relatively even, which prevents the implement from drafting left or right and thus, prevents the implement from skipping portions of swaths or reworking portions of previous swaths. However, when there are variations in the field, such as in moisture content, slope, compaction, and/or the like, the forward and rearward disks may no longer equally engage unworked soil in the field, which may cause the implement to yaw (e.g., rotate about a vertical axis). For instance, if the forward disks engage unworked soil more strongly than the rearward disks, the implement will draft with the angle of the forward disks (e.g., to the left) and, vice versa, if the forward disks engage unworked soil less strongly than the rearward disks, the implement will draft with the angle of the rearward disks (e.g., to the right). Typically, an operator must constantly monitor the implement yaw and adjust the implement pitch to account for the yaw. However, constantly monitoring the implement yaw causes operator fatigue. Further, an operator may not notice yaw until the yaw is significant.

Accordingly, an agricultural system and method for monitoring yaw of towed agricultural implements would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural system for monitoring yaw of an agricultural implement towed by an agricultural work vehicle. The agricultural system may include an agricultural implement having a frame connectable to an agricultural work vehicle, a first plurality of disks supported on the frame, and a second plurality of disks supported on the frame, where each of the first plurality of disks is angled leftward relative to a longitudinal direction of the frame, and each of the second plurality of disks is angled rightward relative to the longitudinal direction. The first plurality of disks may be configured to engage a field at a first penetration depth, and the second plurality of disks may be configured to engage the field at a second penetration depth. The agricultural system may further include an orientation sensor supported on the agricultural implement, with the orientation sensor being configured to generate data indicative of yaw of the agricultural implement. Additionally, the agricultural system may include a computing system communicatively coupled to the orientation sensor. The computing system may be configured to receive the data generated by the orientation sensor indicative of the yaw of the agricultural implement, determine the yaw of the agricultural implement based at least in part on the data generated by the orientation sensor, and initiate a control action based at least in part on the yaw of the agricultural implement.

In another aspect, the present subject matter is directed to an agricultural method for monitoring yaw of an agricultural implement towed by an agricultural work vehicle, where the agricultural implement may have a frame connectable to the agricultural work vehicle, a first plurality of disks supported on the frame and angled leftward relative to a longitudinal direction of the frame, and a second plurality of disks supported on the frame and angled rightward relative to the longitudinal direction. The agricultural method may include receiving, with a computing system, data generated by an orientation sensor supported on the agricultural implement, the data being indicative of yaw of the agricultural implement. The method may further include determining, with the computing system, the yaw of the agricultural implement based at least in part on the data generated by the orientation sensor. Additionally, the method may include performing, with the computing system, a control action based at least in part on the yaw of the agricultural implement.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 illustrates a flow diagram of one embodiment of a method for monitoring yaw of an agricultural implement towed by an agricultural work vehicle in accordance with aspects of the present subject matter.

Figure 1:
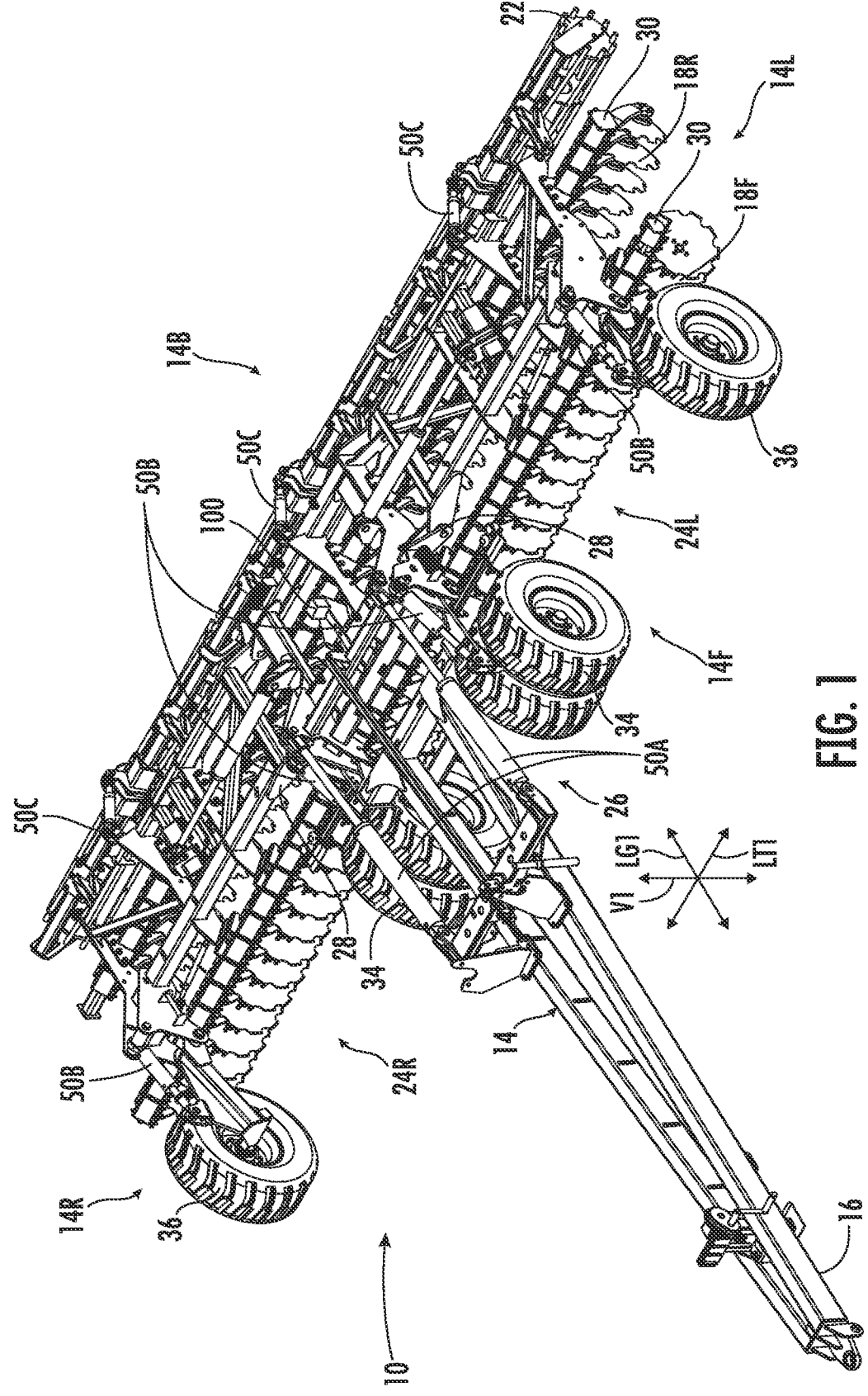
FIG. 1 illustrates a perspective view of an agricultural implement in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring yaw of an agricultural implement towed by an agricultural work vehicle. For instance, an agricultural implement may include a frame configured to support one or more sets of ground-engaging disks that are angled leftward relative to a longitudinal direction of the frame and one or more sets of ground-engaging disks that are angled rightward relative to the longitudinal direction of the frame. In accordance with aspects of the present subject matter, an orientation sensor (e.g., an inertial measurement unit) may be supported on the agricultural implement, with the orientation sensor being configured to generate data indicative of yaw of the agricultural implement. Yaw of the agricultural implement is generally about a vertical axis, whereas roll is about a longitudinal (fore-to-aft) axis, and pitch is about a lateral (left-to-right) axis. A computing system of the disclosed system may be configured to receive the data generated by the orientation sensor indicative of the yaw of the agricultural implement and determine the yaw of the agricultural implement based at least in part on the data generated by the orientation sensor. The computing system may further initiate a control action based at least in part on the yaw of the agricultural implement to make sure that the agricultural implement stays aligned directly behind the towing work vehicle. For instance, if the implement yaw is to the left, the computing system may control one or more actuators of the agricultural implement to reduce a penetration depth of the ground engaging disks that are angled leftward and/or increase a penetration depth of the ground engaging disks that are angled rightward to encourage the agricultural implement to draft right and thus, reduce the leftward yaw. Conversely, if the implement yaw is to the right, the computing system may control one or more actuators of the agricultural implement to increase a penetration depth of the ground engaging disks that are angled leftward and/or decrease a penetration depth of the ground engaging disks that are angled rightward to encourage the agricultural implement to draft left and thus, reduce the rightward yaw. In other embodiments, the computing system may instead, or additionally, control a user interface associated with the agricultural implement to indicate the yaw and/or suggested corrective actions (if any). As such, yaw of a towed agricultural implement may be monitored automatically, which reduces operator fatigue and allows yaw to be accounted for sooner than when an operator manually monitors yaw.

Figure 2:
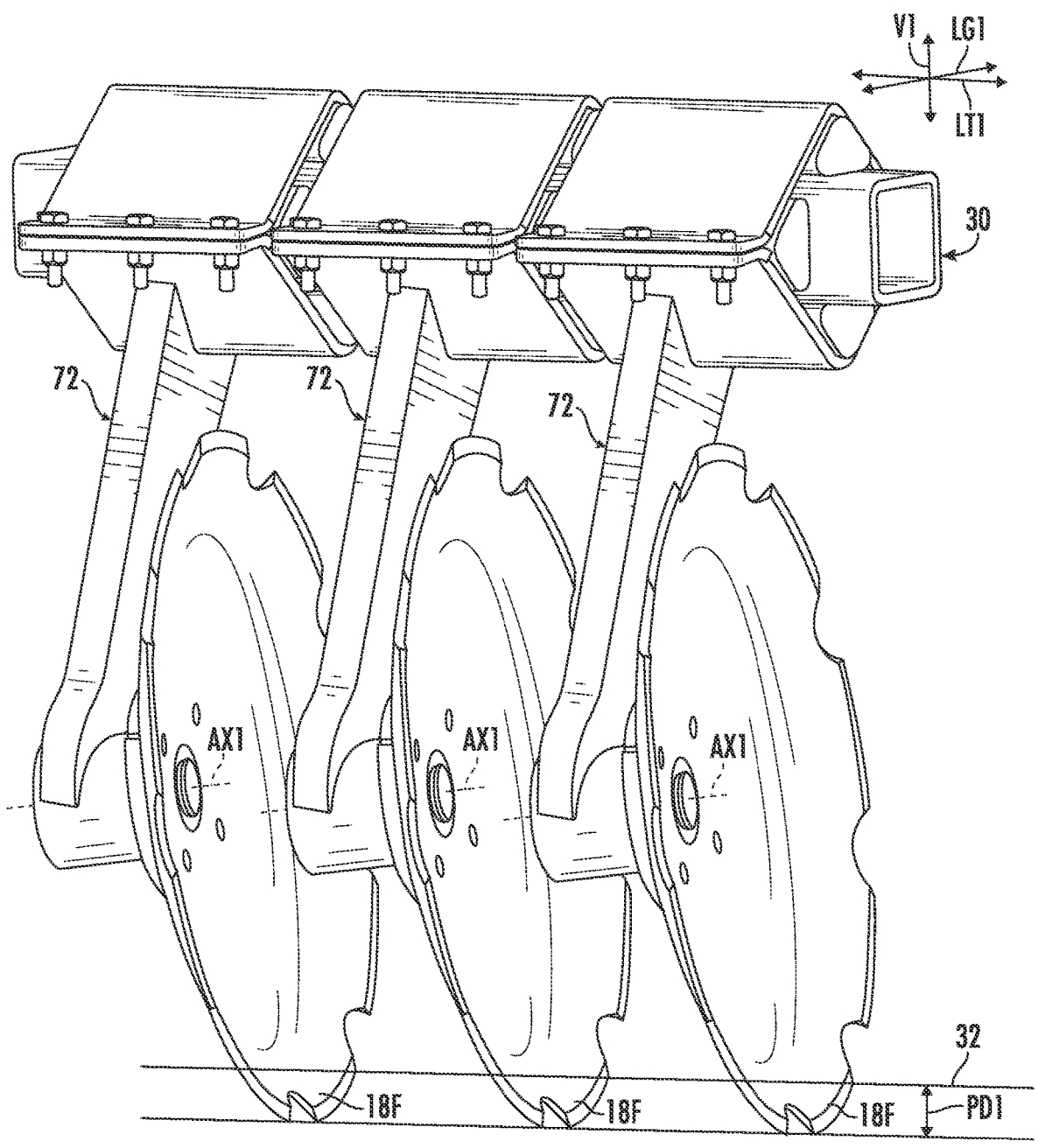
FIG. 2 illustrates a perspective view of a set of ground engaging tools of the agricultural implement shown in FIG. 1 in accordance with aspects of the present subject matter.
Figure 3:
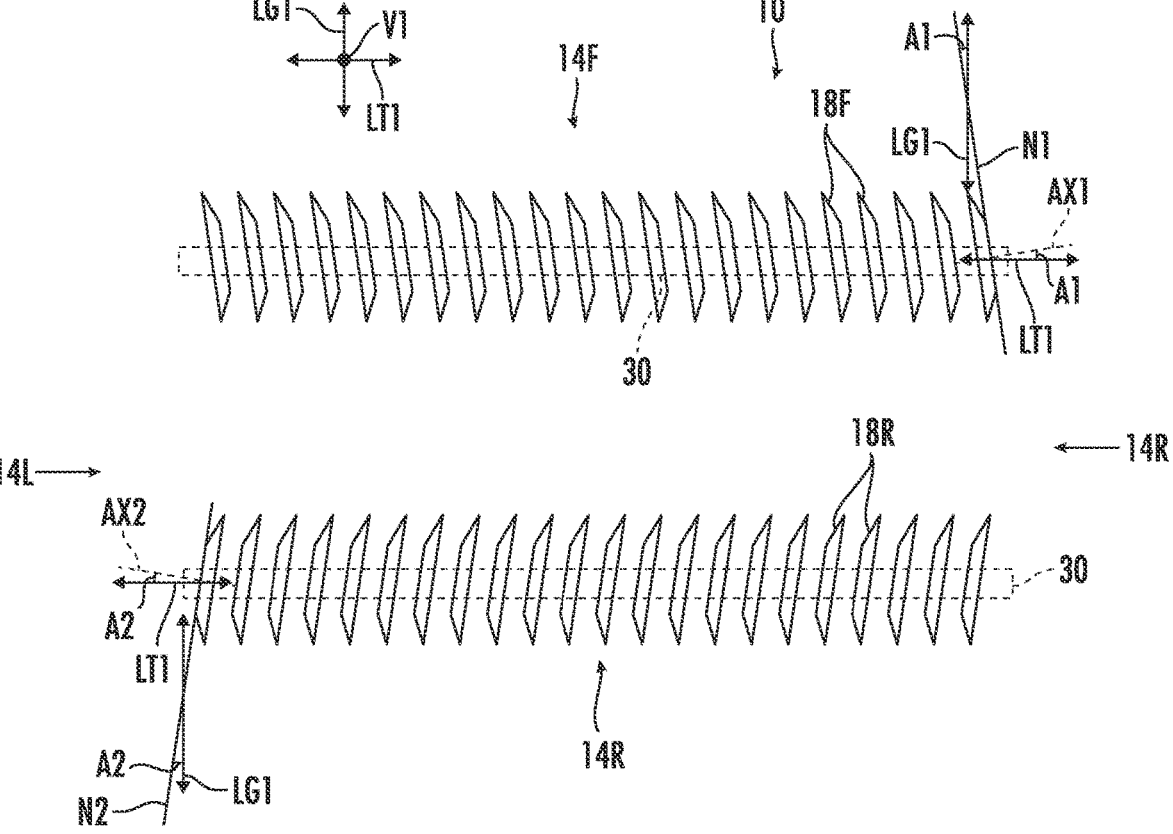
FIG. 3 illustrates a schematic top-down view of the agricultural implement shown in FIG. 1 in accordance with aspects of the present subject matter.
Figure 4:
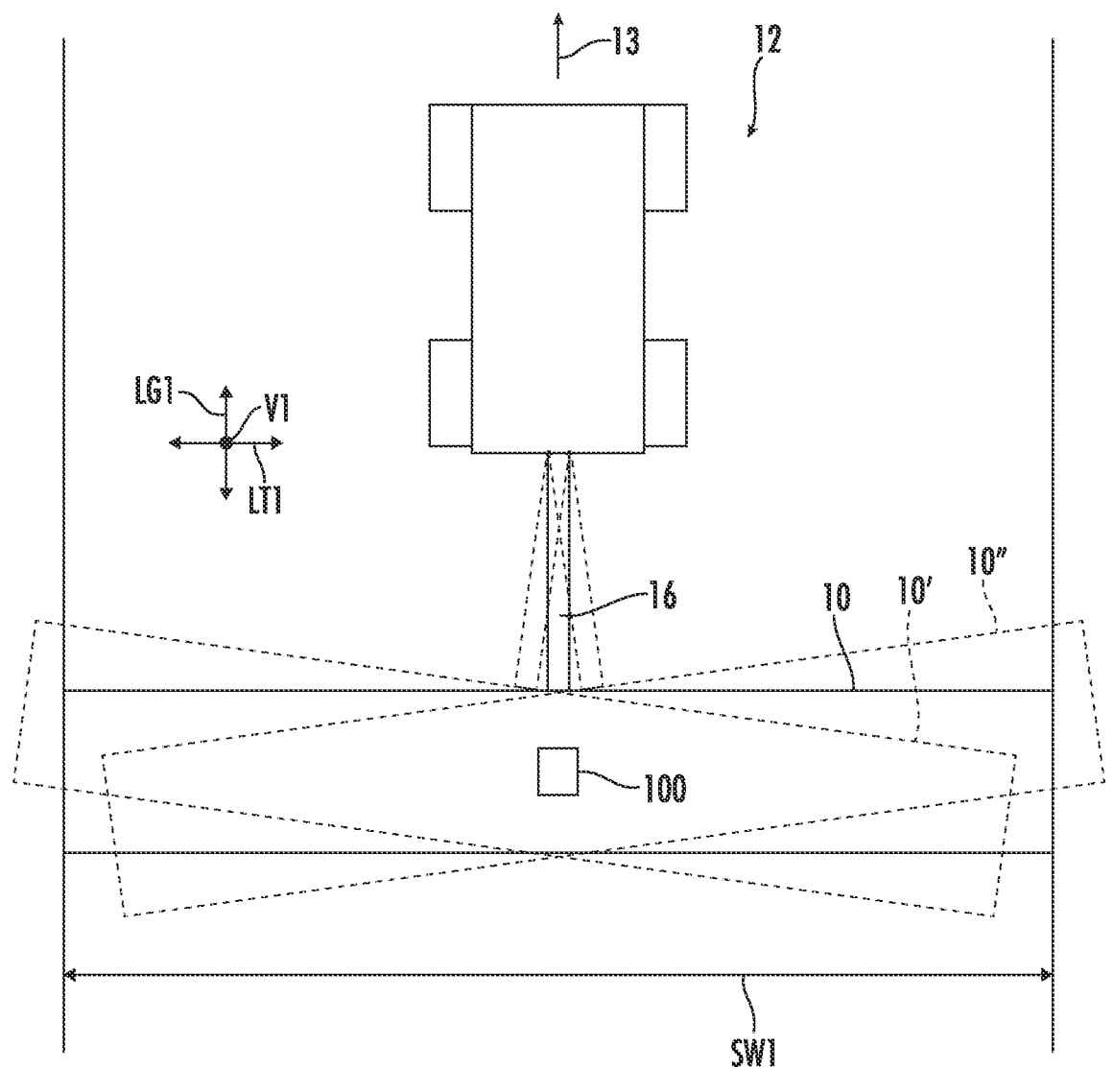
FIG. 4 illustrates a schematic top-down view of the agricultural implement shown in FIG. 1 in accordance with aspects of the present subject matter, particularly illustrating the agricultural implement being towed behind a work vehicle.

Referring now to the drawings, FIGS. 1-4 illustrate different views of one embodiment of a towable agricultural implement 10 in accordance with aspects of the present subject matter. Specifically, FIG. 1 illustrates a perspective view of the agricultural implement 10. Further, FIG. 2 illustrates a perspective view of a set of ground engaging tools of the agricultural implement 10. Moreover, FIG. 3 illustrates a schematic top-down view of the agricultural implement 10. Additionally, FIG. 4 illustrates a schematic top-down view of the agricultural implement 10, particularly illustrating the agricultural implement being towed behind a work vehicle 12.

In general, the implement 10 may be configured to be towed across a field by the work vehicle 12 (FIG. 4). As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As particularly shown in FIG. 1, the agricultural implement 10 may generally include a carriage frame assembly 14 configured to be towed by the work vehicle 12 (FIG. 4) via a pull hitch or towbar 16 while the work vehicle 12 moves in a travel direction (e.g., as indicated by arrow 13 in FIG. 4). The frame assembly 14 generally extends between a forward end 14F and a rearward end 14B along a longitudinal direction LG1, and similarly between a left side 14L and a right side 14R along a lateral direction LT1, with the lateral direction LT1 being generally perpendicular to the longitudinal direction LG1. The towbar 16 extends generally forward from the forward end 14F of the frame assembly 14 along the longitudinal direction LG1. As provided in the illustrated examples, the frame assembly 14 can include a left rotatable wing section 24L and a right rotatable wing section 24R, with the wing sections 24L, 24R being rotatably connected to a central frame section 26 of the frame assembly 14 on opposing lateral sides of the central frame section 26 by a plurality of hinged joints 28 that allow the respective wing frame section 24L, 24R to be folded relative to the central frame section 26. The implement 10 may further be configured to utilize these hinged joints 28 in a manner that allows the respective wing frame section 24L, 24R to flex with respect to the central frame section 26 as the implement 10 is towed across the field during tillage operations.

In various examples, the carriage frame assembly 14 may be configured to support one or more ground-engaging tools, such as disks, basket assemblies, shanks, leveling blades, and/or the like, configured to perform a tillage operation across the field along which the agricultural implement 10 is towed. For instance, the implement 10 includes segmented front and rear ground-engaging tools, in the form of one or more sets of forward ground-engaging disks 18F and one or more sets of ground-engaging rearward disks 18R, that are operatively joined to the frame assembly 14 by front and rear segmented toolbars 30, respectively. The front and rear segmented toolbars 30 are spaced apart along the longitudinal direction LG1 such that the forward set of disks 18F are positioned on the frame 14 forward of the rearward set of disks 18R in the longitudinal direction LG1. In the illustrated embodiment, the toolbars 30 extend generally parallel to the lateral direction LT1. Each of the ground engaging disks 18F, 18R may be joined to the respective toolbar 30 such that the disks 18F, 18R rotate as the circumferential cutting edges engage the ground. For example, as particularly shown in FIG. 2, each of the forward ground-engaging disks 18F is separately coupled to the associated toolbar 30 by a respective support arm 72 such that each forward disk 18F is rotatable about a respective, first axis AX1 and engages the field at a first penetration depth PD1 below the surface of the field 32. It should be appreciated that the first axes AX1 of the disks 18F coupled to the same toolbar 30 are parallel to each other. It should further be appreciated that, while not shown, each of the rear disks 18R may be similarly, separately coupled to the associated toolbar 30 by a respective support arm 72 such that each rear disk 18R of the set is rotatable about a respective, second axis AX2 and engages the field at a second penetration depth PD2 (not shown) below the surface of the field 32, with the second axes AX2 being parallel to each other.

As particularly shown in FIG. 3, the forward disks 18F are angled relative to the rearward disks 18R. For instance, the forward disks 18F are coupled to the forward toolbar 30 such that the forward disks 18F are angled leftward relative to the longitudinal direction LG1, while the rear disks 18R are coupled to the rearward toolbar 30 such that the rear disks 18R are angled rightward relative to the longitudinal direction LG1. For example, the axis of rotation AX1 of each forward disk 18F of the set is at a first angle A1 relative to the lateral direction LT1 of the implement frame 14 in a plane defined by the lateral and longitudinal directions LT1, LG1, such that a plane N1 of each disk 18F normal to the axis of rotation AX1 is at the first angle A1 relative to the longitudinal direction LG1. Similarly, the axis of rotation AX2 of each rear disk 18R of the set is at a second angle A2 relative to the lateral direction LT1 in a plane defined by the lateral and longitudinal directions LT1, LG1, such that a plane N2 of each disk 18R normal to the axis of rotation AX2 is at the second angle A2 relative to the longitudinal direction LG1. In some instances, the first angle A1 and the second angle A2 are equal in magnitude, but opposite in direction. However, in other embodiments, the angles A1, A2 may have different, non-zero magnitudes.

Referring back to FIG. 1, the implement 10 can also include surface finishing tools, which may be in the form of rotating basket assemblies 22, operatively attached to the rear portion of the implement 10, rearward of the disks 18F, 18R in the longitudinal direction LG1. The basket assemblies 22 may be configured to break up clumps of soil produced by the disks 18F, 18R, while also leveling the field surface in preparation for future field operations (e.g., planting). The toolbars 30 and sets of disks 18F, 18R can be segmented and attached to the central frame section 26 and/or the wing frame sections 24L, 24R in a manner that allows the wing frame sections 24L, 24R and the segments of the sets of disks 18F, 18R to be folded above the central frame section 26. Similarly, the surface finishing tools 22 can also be segmented and attached to the central frame section 26 and/or the wing frame sections 24L, 24R in a manner that allows the wing frame sections 24L, 24R and the surface finishing tools operably coupled therewith to be folded above the central frame section 26, to thereby narrow the implement 10 for transport on public roadways.

As further shown in FIG. 1, the implement 10 can be supported above a field by one or more central frame section support wheel assemblies 34 and/or the wing frame wheel assemblies 36. Each of the wheel assemblies 34, 36 may include at least one wheel and a frame section support coupling the wheel to the respective frame section 24L, 24R, 26. Additionally, the implement 10 may include an adjustment assembly for setting and maintaining a penetration depth of the ground-engaging tools of the implement 10 below the surface of the field. For instance, the adjustment assembly may include one or more tilt actuators 50A coupled between the central frame section 26 and the towbar 16, with the tilt actuator(s) 50A being selectively controllable to adjust a fore-aft pitch of the implement 10. The adjustment assembly may additionally, or alternatively, include one or more wheel actuators 50B coupled between each of the wheel assemblies 34, 36 and the frame 14, with the wheel actuator(s) 50B being selectively controllable to set the penetration depth of the disks 18F, 18R. Additionally, or alternatively, the adjustment assembly may include one or more basket actuators 50C coupled between the basket assemblies 22 and the frame 14, the basket actuator(s) 50C being selectively controllable to adjust an aggressiveness of the basket assemblies 22 and, in turn, the penetration depth of at least the rear disks 18R. The actuators 50A, 50B, 50C may be any suitable actuators, such as pneumatic, hydraulic, and/or electro-mechanical actuators.

Typically, the penetration depths PD1, PD2 of the forward disks 18F and the rear disks 18R are selected such that the forward and rear disks 18F, 18R evenly engage unworked soil (e.g., soil that has not yet been worked during the tillage operation). For instance, pitch of the implement 10 may be set such that the penetration depth PD1 of the forward disks 18F is shallower than the penetration depth PD2 of the rear disks 18R, such that the forward and rear disks 18F, 18R work a similar depth of unworked soil. When the forward and rear disks 18F, 18R evenly engage unworked soil on flat land, the implement 10 may stay directly (e.g., centered) behind the towing work vehicle 12, as shown with the implement 10 in solid lines shown in FIG. 4, when working a swath SW1 in a field. However, if the forward and rear disks 18F, 18R do not evenly engage unworked soil and/or if the field is sloped, the implement 10 may begin to draft or yaw in the direction of the disks 18F, 18R that engages the unworked soil more strongly. For instance, if the forward disks 18F (angled leftward) engage unworked soil more strongly than the rear disks 18R (angled rightward), the implement 10 may begin to draft leftward behind the work vehicle 12, as shown with the implement 10' in FIG. 4. Conversely, if the rear disks 18R (angled rightward) engage unworked soil more strongly than the forward disks 18F (angled leftward), the implement 10 may begin to draft or yaw rightward behind the work vehicle 12, as shown with the implement 10" in FIG. 4. When the work vehicle 12 begins to yaw, the implement 10 may end up skipping portions of the swath SW1 and/or reworking portions of previous swaths that were previously worked by the implement 10, which requires adjustments during subsequent swaths and/or requires additional passes to work the skipped portions. It should be appreciated that yaw of the agricultural implement 10 is generally about an axis extending in the vertical direction V1, whereas roll of the agricultural implement 10 is about an axis extending in the longitudinal direction LG1, and pitch of the agricultural implement 10 is about an axis extending in the lateral direction LT1.

Thus, in accordance with aspects of the present subject matter, one or more orientation sensors 100 are provided in operative association with the agricultural implement 10 and configured to generate data indicative of at least yaw of the agricultural implement 10 as the implement 10 is being moved across the field during an agricultural operation. For instance, the orientation sensor(s) 100 may be coupled to the implement 10, such as to the central frame section 26, to the tow bar 16, and/or any other suitable portion of the implement 10. In some instances, the orientation sensor(s) 100 is integrated into an implement control unit configured to control the operation of at least one or more of the actuators 50A, 50B, 50C of the agricultural implement. The orientation sensor(s) 100 may be configured as any suitable sensor for determining the yaw of the implement 10, such as an inertial measurement unit (IMU), an accelerometer(s), an angular potentiometer(s) (e.g., between the hitch 16 and the work vehicle 12), and/or the like. In some embodiments, the orientation sensor(s) 100 may additionally be configured to monitor the roll and/or pitch of the agricultural implement 10. In one or more embodiments, the orientation sensor(s) 100 may be configured to monitor yaw more indirectly. For example, the orientation sensor(s) 100 may include distance sensor(s) configured to monitor to the distance between the left and right sides of the implement 10 and the work vehicle 12, where the differential between the distance from the left side of the implement to the work vehicle 12 and the distance from the right side of the implement 10 to the work vehicle 12 is indicative of the yaw of the implement 10.

As will be described below in greater detail, the yaw of the agricultural implement 10 may be indicative of the position of the implement 10 behind the work vehicle 12. As such, the yaw of the agricultural implement 10 may be monitored to identify when the implement 10 is starting to move out from being directly aligned behind the work vehicle 12.

It should be appreciated that the configuration of the implement 10 described above and shown with reference to FIGS. 1-4, and the work vehicle 12 described above and shown schematically in FIG. 4 are provided only to place the present subject matter in an exemplary field of use. Thus, it should be appreciated that the present subject matter may be readily adaptable to any manner of implement and work vehicle configurations.

For instance, in one embodiment, instead of the forward disks 18F being angled to the left and the rear disks 18R being angled to the right, the forward disks 18F may instead be angled to the right while the rear disks 18R are angled to the left. In some embodiments, instead of the disks 18F, 18R being individually mounted to the respective toolbars 30, the disks 18F, 18R may form forward and rear disk gangs, where the disk gangs are mounted together to the respective toolbars 30. For example, the forward disks 18F may form one or more forward disk gangs, with the forward disks 18F of each forward disk gang being rotatable about a respective forward disk gang shaft defining a first rotational axis at a non-zero angle (e.g., angle A1) relative to the longitudinal direction LG1 of the frame 14 (e.g., with the respective toolbar(s) 30 being at a non-zero angle (e.g., angle A1) relative to the lateral direction LT1 of the frame 14). Similarly, the rear disks 18R may form one or more rear disk gangs, with the rear disks 18R of each rear disk gang being rotatable about a common rear disk gang shaft defining a second rotational axis at a non-zero angle (e.g., angle A2) relative to the longitudinal direction LG1 (e.g., with the respective toolbar(s) 30 being at a non-zero angle (e.g., angle A2) relative to the lateral direction LT1). Additionally, or alternatively, in some embodiments, instead of all the forward disks 18F extending in the same direction (e.g., leftward) and all of the rear disks 18R extending in the same direction (e.g., rightward), the forward disks 18F extending from the left lateral side of the central frame section 26 may extend in one direction (e.g., rightward), while the forward disks 18F extending from the right lateral side of the central frame section 26 may extend in the opposite direction (e.g., leftward), and similarly, the rear disks 18R extending from the left lateral side of the central frame section 26 may extend in one direction (e.g., leftward), while the rear disks 18R extending from the right lateral side of the central frame section 26 may extend in the opposite direction (e.g., rightward).

Figure 5:
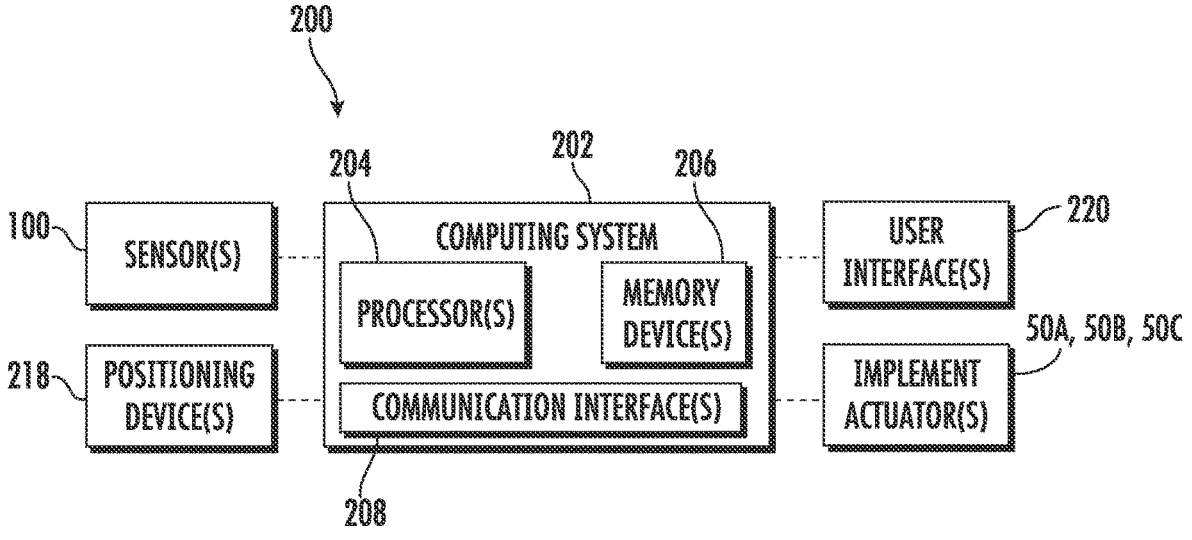
FIG. 5 illustrates a schematic view of a system for monitoring yaw of an agricultural implement towed by an agricultural work vehicle in accordance with aspects of the present subject matter.

Referring now to FIG. 5, a schematic view of one embodiment of a system 200 for monitoring yaw of an agricultural implement is illustrated in accordance with aspects of the present subject matter. In general, the system 200 will be described herein with reference to the implement 10 described above with reference to FIGS. 1-4 and the work vehicle 12 described with reference to FIG. 4. However, it should be appreciated by those of ordinary skill in the art that the disclosed system 200 may generally be utilized with agricultural implements having any other suitable implement configurations, and/or with work vehicles having any other suitable work vehicle configuration.

As shown in FIG. 5, the system 200 may include any combination of components of the agricultural implement 10 and the work vehicle 12 described above with reference to FIGS. 1-4. For instance, the system 200 may include: one or more sensors (e.g., the orientation sensor(s) 100) for generating data indicative of at least the yaw of the agricultural implement 10, one or more user interfaces (e.g., the user interface 220), and/or one or more implement actuators (e.g., implement actuator(s) 50A, 50B, 50C). It should be appreciated that the user interface(s) 220 may include one or more feedback devices (not shown), such as display screens, speakers, warning lights, and/or the like. In addition, some embodiments of the user interface(s) 220 may include one or more input devices (not shown), such as touchscreens, keypads, touchpads, knobs, buttons, sliders, switches, mice, microphones, and/or the like, for allowing an operator to provide inputs to the system 200. Additionally, in some embodiments, the system 200 may be communicatively coupled to one or more positioning device(s) 218 to determine the location of the implement 10 and/or the work vehicle 12, such as a satellite navigation positioning device (e.g., a GPS system, a Galileo positioning system, a Global Navigation satellite system (GLONASS), a BeiDou Satellite Navigation and Positioning system, a dead reckoning device, and/or the like).

Additionally, as shown in FIG. 5, the system 200 may include a computing system 202 configured to electronically control the operation of one or more components of the agricultural implement 10. In general, the computing system 202 may comprise any suitable processor-based device known in the art, such as a computing device or any suitable combination of computing devices. Thus, in several embodiments, the computing system 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the computing system 202 may generally comprise memory element(s) including, but not limited to, a computer readable medium (e.g., random access memory RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the computing system 202 to perform various computer-implemented functions, such as one or more aspects of the methods and algorithms that will be described herein. In addition, the computing system 202 may also include various other suitable components, such as a communications circuit or module, one or more input/output channels, a data/control bus and/or the like.

It should be appreciated that, in several embodiments, the computing system 202 may correspond to an existing computing device or controller of the agricultural implement 10, which may reduce costs for implementing the disclosed system and method. However, it should also be appreciated that, in other embodiments, the computing system 202 may correspond to a separate processing device. For instance, in one embodiment, the computing system 202 may form all or part of a separate plug-in module that may be installed within the agricultural implement 10 and/or work vehicle 12 to allow for the disclosed system and method to be implemented without requiring additional software to be uploaded onto existing control devices of the agricultural implement 10 and/or work vehicle 12.

Additionally, in some embodiments, the computing system 202 may be configured to include a communications module or interface 208 to allow for the computing system 202 to communicate with any of the various other system components described herein. For instance, as described above, the computing system 202 may, in several embodiments, be configured to receive data inputs from the orientation sensor(s) 100, and/or positioning device(s) 218, and to receive inputs from and/or provide control instructions to the user interface(s) 220 and/or the implement actuator(s) 50A, 50B, 50C. It should be appreciated that the computing system 202 may be communicatively coupled to the various components of the system 200 via any suitable connection, such as a wired or wireless connection.

In accordance with aspects of the present subject matter, the computing system 202 may be configured to monitor the yaw of the agricultural implement 10 during a tillage operation of the implement 10, where the implement 10 is being moved across the field with the ground-engaging tools (e.g., disks 18F, 18R, and basket assemblies 22) engaging the field. Specifically, in one embodiment, the computing system 202 may be configured to receive the data generated by the orientation sensor(s) 100 and determine or estimate the yaw of the implement 10 based on the data generated by the orientation sensor(s) 100. For instance, the computing system 202 may include a look-up table, suitable mathematical formula, and/or algorithms stored in its memory 206 that correlates the data generated by the orientation sensor(s) 100 to yaw of the implement 10 relative to the work vehicle 12. In some instances, the computing system 202 may be configured to additionally determine whether the draft is caused by sloping of the field. For example, the computing system 202 may be configured to additionally receive data indicative of the roll of the agricultural implement 10 (e.g., from the orientation sensor(s) 100 as an IMU, etc.) and determine if the implement 10 is potentially on a hill or slope, and thus, yawing due in part to gravity. Similarly, in some instances, the computing system 202 may be configured to additionally determine the current fore-to-aft pitch of the implement 10 to determine whether the draft is being caused by the pitch of the implement. For example, the computing system 202 may be configured to additionally receive data indicative (e.g., from the orientation sensor(s) 100 as an IMU, etc.) and determine if the implement 10 is pitched in a direction that would cause yaw in the current yaw direction (e.g., pitched so that leftward disks engage unworked soil more than rightward disks and the current yaw direction is to the left, pitched so that rightward disks engage unworked soil more than leftward disks and the current yaw direction is to the right).

During the tillage operation, the work vehicle 12 typically is steered along relatively straight swaths such that the implement 10 should not experience much, if any, yaw due to the steering of the work vehicle 12 while traversing the swaths. As such, the computing system 202 may monitor the yawing of the implement 10 based at least in part on the data generated by the orientation sensor(s) 100 to determine when the implement 10 is yawing and if the yaw of the implement 10 requires corrective action. For instance, in some embodiments, the computing system 202 may monitor the magnitude of the yaw of the implement 10 to determine if the yaw is increasing. If the magnitude of the yaw continues to increase over a period of time (e.g., a few seconds, a minute, a distance traveled, and/or the like), the computing system 202 may determine that the yaw is getting worse and needs correction. In some embodiments, the computing system 202 may compare the magnitude of the yaw of the implement 10 to a yaw threshold. If the magnitude of the yaw crosses (e.g., exceeds) the yaw threshold, the computing system 202 may determine that the yaw needs to be corrected. The yaw threshold may be determined or selected in any suitable manner. For instance, the yaw threshold may be pre-set and uploaded to the computing system 202, input by an operator via the user interface(s) 220, and/or the like.

In some instances, the computing system 202 may monitor the position of the implement 10 within the field based at least in part on data from the positioning device(s) 218 and determine from a map (e.g., a tillage prescription map and/or the like) whether the work vehicle 12 is likely turning at the location. If the vehicle 12 is determined to not be likely turning at the location, then any yaw of the implement 10 is not likely caused by steering of the work vehicle 12, but instead is more likely to be caused by sloping of the field and/or imbalanced engagement between leftward and rightward angled disks 18F, 18R. If the vehicle 12 is determined to be likely turning at the location, then yaw of the implement 10 may be caused by steering of the work vehicle 12, and the computing system 202 may continue monitoring the yaw of the implement 10 to see if the yaw corrects after the vehicle 12 stops turning.

If the computing system 202 determines that the yaw needs to be corrected, then the computing system 202 may further configured to initiate one or more control actions. Specifically, the computing system 202 may be configured to automatically control one or more components of the agricultural implement 10 and/or the work vehicle 12 when it is determined that the yaw needs to be corrected. For instance, in some embodiments, the computing system 202 may be configured to control an operation of the user interface(s) 220 to indicate to an operator that the implement is yawing, indicate the magnitude and/or direction of the yaw, and/or potential actions to correct the yaw. In one or more embodiments, the computing system 202 may additionally, or alternatively, be configured to indicate to the operator via the user interface(s) 220 a location(s) of the field associated with the implement yawing so that areas of the field that may have been skipped may be worked and/or so that a subsequent operation in the field (e.g., planting operation) may be adjusted to account for the areas of the field that may have been skipped or double-worked.

In one or more embodiments, when it is determined that the yaw needs to be corrected, the computing system 202 may be configured to automatically control an operation of the implement actuator(s) 50A, 50B, 50C to attempt to reduce the yaw of the implement 10. For instance, the computing system 202 may be configured to control the actuator(s) 50A, 50B, 50C to change a ratio of the penetration depth of the leftward angled disks to the penetration depth of the rightward angled disks. More particularly, the computing system 202 may control the operation of the tilt actuator(s) 50A to adjust the fore-aft levelness of the frame 14 of the implement 10 to adjust the penetration depth(s) PD1, PD2 of the disks 18F, 18R, the operation of the wheel actuator(s) 50B to alter the penetration depth(s) PD1, PD2 of the disks 18F, 18R, and/or the operation of the basket actuator(s) 50C to change the aggressiveness of the basket(s) 22 and the penetration depth PD2 of at least the rear disks 18R.

For example, if it is determined that the implement 10 is yawing to the left or leftward relative to the direction of travel 13 of the work vehicle, as shown with implement 10' in dashed-lines in FIG. 4, then the computing system 202 may be configured to control the operation of the actuator(s) 50A, 50B, 50C to increase the penetration depth of the disks that are angled rightward (e.g., such that the penetration depth PD2 of the rear disks 18R becomes deeper) and/or reduce the penetration depth of the disks that are angled leftward (e.g., such that the penetration depth PD1 of the forward disks 18F is shallower), such that the implement 10 is steered to the right to overcome the draft or yaw of the implement to the left. Conversely, if it is determined that the implement 10 is yawing to the right relative to the direction of travel 13 of the work vehicle, as shown with implement 10" in dashed-lines in FIG. 4, then the computing system 202 may be configured to control the operation of the actuator(s) 50A, 50B, 50C to decrease the penetration depth of the disks that are angled rightward (e.g., such that the penetration depth PD2 of the rear disks 18R becomes shallower) and/or increase the penetration depth of the disks that are angled leftward (e.g., such that the penetration depth PD1 of the forward disks 18F becomes deeper), such that the implement 10 is steered to the left to overcome the draft or yaw of the implement to the right. As such, the orientation sensor(s) 100 may allow the computing system 202 to perform closed-loop control of the implement 10 to reduce or eliminate unwanted yaw, which reduces operator fatigue and may account for yaw quicker than an operator.

After the computing system 202 adjusts the operation of the actuator(s) 50A, 50B, 50C to attempt to correct the yaw of the implement, the computing system 202 may be configured to determine if further correction is necessary. For instance, the computing system 202 may determine an updated yaw of the implement 10. If the magnitude of the updated yaw of the implement 10 after performing the corrective action is still greater than the yaw threshold, the computing system 202 may perform a further control action. For instance, in some embodiments, the computing system

202 may further adjust the operation of the actuator(s) 50A, 50B, 50C to further try to correct the yaw of the implement and/or indicate to an operator that further intervention, such as steering of the work vehicle 12, is necessary. In one embodiment, the computing system 202 may additionally, or alternatively, control an operation of a steering system (not shown) of the work vehicle 12 to steer the work vehicle 12 opposite the direction of the yaw of the implement 10 to compensate for the yaw of the implement 10.

Referring now to FIG. 6, a flow diagram of one embodiment of a method 300 for monitoring yaw of a towed agricultural implement is illustrated in accordance with aspects of the present subject matter. In general, the method 300 will be described herein with reference to the implement 10 described above with reference to FIGS. 1-4, the work vehicle described herein with reference to FIG. 4, and the system 200 described with reference to FIG. 5. However, it should be appreciated by those of ordinary skill in the art that the disclosed method 300 may generally be utilized with agricultural implements having any other suitable implement configurations, with work vehicles having any other suitable work vehicle configuration, and/or with systems having any other suitable system configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 6, at (302), the method 300 may include receiving data generated by an orientation sensor supported on an agricultural implement having a first plurality of disks angled leftward relative to a longitudinal direction of the agricultural implement and a second plurality of disks angled rightward relative to the longitudinal direction, the data being indicative of yaw of the agricultural implement. For instance, as described above, the computing system 202 may receive data generated by the orientation sensor(s) 100 supported on the agricultural implement 10, where the agricultural implement 10 has a first plurality of disks (e.g., rear disks 18R) angled leftward relative to a longitudinal direction LG1 of the agricultural implement 10, and a second plurality of disks (e.g., forward disks 18F) angled rightward relative to the longitudinal direction LG1. The data generated by the orientation sensor(s) 100 is indicative of yaw of the agricultural implement 10.

Further, at (304), the method 300 may include determining the yaw of the agricultural implement based at least in part on the data generated by the orientation sensor. For example, as discussed above, the computing system 202 may be configured to determine the yaw of the agricultural implement 10 based at least in part on the data generated by the orientation sensor(s) 100.

Additionally, at (306), the method 300 may include performing a control action based at least in part on the yaw of the agricultural implement. For instance, as discussed above, the computing system 202 may be configured to perform a control action based at least in part on the yaw of the agricultural implement 10. For example, the control action may include controlling an operation of the user interface(s) 220 to indicate the yaw of the agricultural implement 10, controlling an operation of one or more of the actuator(s) 50A, 50B, 50C, and/or a combination thereof.

It is to be understood that the steps of the method 300 are performed by the computing system 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 202 described herein, such as the method 300, is implemented in software code or instructions which are tangibly stored on a tangible computer readable medium. The computing system 202 loads the software code or instructions via a direct interface with the computer readable medium or via a wired and/or wireless network. Upon loading and executing such software code or instructions by the computing system 202, the computing system 202 may perform any of the functionality of the computing system 202 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural system for monitoring yaw of an agricultural implement towed by an agricultural work vehicle, the agricultural system comprising:

an agricultural implement, the agricultural implement being a tillage implement comprising: a frame connectable to an agricultural work vehicle; a first plurality of disks supported on the frame, each of the first plurality of disks being angled leftward relative to a longitudinal direction of the frame such that an axis of rotation of each of the first plurality of disks is angled relative to a plane defined by the longitudinal direction and a lateral direction of the agricultural implement, the first plurality of disks configured to engage a field at a first penetration depth; and a second plurality of disks supported on the frame, each of the second plurality of disks being angled rightward relative to the longitudinal direction such that an axis of rotation of each of the second plurality of disks is angled relative to the plane defined by the longitudinal direction and the lateral direction each of the first plurality of disks being angled leftward relative to a longitudinal direction of the frame, each of the second plurality of disks being angled rightward relative to the longitudinal direction, the first plurality of disks configured to engage a field at a first penetration depth, the second plurality of disks configured to engage the field at a second penetration depth, the first plurality of disks being spaced apart from the second plurality of disks along one or both of the longitudinal direction or the lateral direction;

an orientation sensor supported on the agricultural implement, the orientation sensor being configured to generate data indicative of yaw of the agricultural implement;

a computing system communicatively coupled to the orientation sensor, the computing system being configured to:

receive the data generated by the orientation sensor indicative of the yaw of the agricultural implement;

determine the yaw of the agricultural implement based at least in part on the data generated by the orientation sensor; and initiate a control action based at least in part on the yaw of the agricultural implement.

2. The agricultural system of claim 1, wherein the computing system is further configured to compare the yaw to a yaw threshold, and wherein the computing system is configured to initiate the control action when the yaw crosses the yaw threshold.

3. The agricultural system of claim 1, further comprising an actuator selectively controllable to move at least one of the first plurality of disks or the second plurality of disks relative to the field, wherein initiating the control action comprises controlling the actuator to adjust at least one of the first penetration depth or the second penetration depth.

4. The agricultural system of claim 3, wherein, when the yaw is leftward, the control action comprises controlling the actuator to move the at least one of the first plurality of disks or the second plurality of disks such that at least one of the first penetration depth becomes shallower or the second penetration depth becomes deeper, and wherein, when the yaw is rightward, the control action comprises controlling the actuator to move the at least one of the first plurality of disks or the second plurality of disks such that at least one of the first penetration depth becomes deeper or the second penetration depth becomes shallower.

5. The agricultural system of claim 4, wherein the first plurality of disks is one of a forward set of disks or a rearward set of disks and the second plurality of disks is another of the forward set of disks or the rearward set of disks, the forward set of disks being positioned on the frame forward of the rearward set of disks in the longitudinal direction.

6. The agricultural system of claim 3, wherein the computing system is further configured to:

determine an updated yaw of the agricultural implement based at least in part on the data generated by the orientation sensor after controlling the actuator; and initiate a further control action if the updated yaw is above a yaw threshold.

7. The agricultural system of claim 3, wherein the actuator comprises at least one of a tilt actuator, a wheel actuator, or a basket actuator.

8. The agricultural system of claim 1, wherein initiating the control action comprises controlling an operation of a user interface to indicate the yaw.

9. The agricultural system of claim 1, wherein the data generated by the orientation sensor is further indicative of at least one of a pitch or a roll of the agricultural implement, the computing system being further configured to determine the at least one of the pitch or the roll of the agricultural implement based at least in part on the data generated by the orientation sensor, wherein the computing system is configured to initiate the control action based at least in part on the yaw and the at least one of the pitch or the roll of the agricultural implement.

10. The agricultural system of claim 1, wherein the orientation sensor comprises an inertial measurement unit (IMU).

11. An agricultural method for monitoring yaw of an agricultural implement towed by an agricultural work vehicle, the agricultural implement being a tillage implement comprising a frame connectable to the agricultural work vehicle, a first plurality of disks supported on the frame, each of the first plurality of disks being angled leftward relative to a longitudinal direction of the frame such that an axis of rotation of each of the first plurality of disks is angled relative to a plane defined by the longitudinal direction and a lateral direction of the agricultural implement, the first plurality of disks being configured to engage a field at a first penetration depth, and a second plurality of disks supported on the frame, each of the second plurality of disks being angled rightward relative to the longitudinal direction such that an axis of rotation of each of the second plurality of disks is angled relative to the plane defined by the longitudinal direction and the lateral direction, the second plurality of disks configured to engage the field at a second penetration depth, the first plurality of disks being spaced apart from the second plurality of disks along one or both of the longitudinal direction or the lateral direction, the agricultural method comprising:

receiving, with a computing system, data generated by an orientation sensor supported on the agricultural implement, the data being indicative of yaw of the agricultural implement;

determining, with the computing system, the yaw of the agricultural implement based at least in part on the data generated by the orientation sensor; and performing, with the computing system, a control action based at least in part on the yaw of the agricultural implement.

12. The agricultural method of claim 11, further comprising comparing, with the computing system, the yaw to a yaw threshold, wherein performing the control action based at least in part on the yaw comprises performing the control action when the yaw crosses the yaw threshold.

13. The agricultural method of claim 11, wherein performing the control action comprises controlling an actuator to move at least one of the first plurality of disks or the second plurality of disks relative to a field to adjust at least one of the first penetration depth of the first plurality of disks within the field or the second penetration depth of the second plurality of disks within the field based at least in part on the yaw.

14. The agricultural method of claim 13, wherein, when the yaw is leftward, controlling the actuator comprises controlling the actuator to move the at least one of the first plurality of disks or the second plurality of disks such that at least one of the first penetration depth becomes shallower or the second penetration depth becomes deeper, and wherein, when the yaw is rightward, controlling the actuator comprises controlling the actuator to move the at least one of the first plurality of disks or the second plurality of disks such that at least one of the first penetration depth becomes deeper or the second penetration depth becomes shallower.

15. The agricultural method of claim 13, further comprising:

determining, with the computing system, an updated yaw of the agricultural implement based at least in part on the data generated by the orientation sensor after controlling the actuator;

and initiating a further control action when the updated yaw is above a yaw threshold.

16. The agricultural method of claim 11, wherein performing the control action comprises controlling an operation of a user interface to indicate the yaw.

17. The agricultural method of claim 11, wherein the data generated by the orientation sensor is further indicative of at least one of a pitch or a roll of the agricultural implement, the agricultural method further comprising determining, with the computing system, the at least one of the pitch or the roll of the agricultural implement based at least in part on the data generated by the orientation sensor, wherein performing the control action comprises performing the control action based at least in part on the yaw and the at least one of the pitch or the roll of the agricultural implement.

18. The agricultural method of claim 11, wherein the orientation sensor comprises an inertial measurement unit (IMU).

* * * * *